(12) United States Patent
Naik et al.

(10) Patent No.: US 8,366,546 B1
(45) Date of Patent: Feb. 5, 2013

(54) GAMELETS

(75) Inventors: Samir Naik, San Francisco, CA (US);
Austin Sung, San Francisco, CA (US);
Richard Phan, San Francisco, CA (US)

(73) Assignee: Zynga Inc., San Francisco, CA (US)

( * ) Notice: Subject to any disclaimer, the term of this patent is extended or adjusted under 35 U.S.C. 154(b) by 0 days.

(21) Appl. No.: 13/356,595

(22) Filed: Jan. 23, 2012

(51) Int. Cl.
*A63F 13/02* (2006.01)
*A63F 13/12* (2006.01)
*G06Q 99/00* (2006.01)
*G06F 3/00* (2006.01)

(52) U.S. Cl. ............ 463/31; 463/42; 705/319; 715/758

(58) Field of Classification Search ............... 463/30, 463/31, 40–42; 705/319; 715/758
See application file for complete search history.

(56) References Cited

U.S. PATENT DOCUMENTS

| | | | |
|---|---|---|---|
| 5,356,156 A * | 10/1994 | Suzuki et al. ............ | 463/31 |
| 6,582,299 B1 * | 6/2003 | Matsuyama et al. ...... | 463/2 |
| 6,887,157 B2 * | 5/2005 | LeMay et al. ............ | 463/32 |
| 7,465,230 B2 * | 12/2008 | LeMay et al. ............ | 463/32 |
| 2002/0023230 A1 * | 2/2002 | Bolnick et al. .......... | 713/202 |
| 2003/0032479 A1 * | 2/2003 | LeMay et al. ............ | 463/32 |
| 2005/0075167 A1 * | 4/2005 | Beaulieu et al. ......... | 463/32 |
| 2005/0200077 A1 * | 9/2005 | Brian .................... | 273/242 |
| 2005/0233799 A1 * | 10/2005 | LeMay et al. ............ | 463/20 |
| 2006/0235790 A1 * | 10/2006 | Jung et al. .............. | 705/39 |
| 2006/0287058 A1 * | 12/2006 | Resnick et al. ........... | 463/19 |
| 2008/0045331 A1 * | 2/2008 | LeMay et al. ............ | 463/25 |

OTHER PUBLICATIONS

R. Empson, "With a New Suite of Games, Arkadium Lets Gamers Play Right on Their Facebook Walls," TechCrunch, Apr. 28, 2011 (available on Apr. 28, 2011 at the following URL: http://techcrunch.com/2011/04/28/with-a-new-suite-of-games-arkadium-lets-gamers-play-right-on-their-facebook-walls/).

* cited by examiner

*Primary Examiner* — David L Lewis
*Assistant Examiner* — Matthew D. Hoel
(74) *Attorney, Agent, or Firm* — Martine Penilla Group, LLP

(57) ABSTRACT

According to a method for displaying an online game in a content stream, a website logon is received from a user of a computing device and an associated profile is retrieved. The content stream associated with the profile is displayed in a GUI presented by the computing device. The content stream includes multiple views associated with different games that are multiplayer online games. The view associated with a game is updated in response to an event recognized by the game mechanics model of this game. The view associated with the game is relocated to a location of prominence in the content stream, if the user data indicates that the user is a participant of the game. The relative location of the view associated with the game is maintained within the content stream, if the user data indicates that the user is a spectator of the game.

25 Claims, 9 Drawing Sheets

Game Play by Player B

Define Game Parameter Player A

Find Opponent to Create Game Player A

Game State Progresses In Stream

Game State Progresses In Stream

Post Game State In Stream

GAMELETS

BACKGROUND

Playing online games, i.e., games played over a computer network, is a popular Internet-based activity. Some online games are single-player games, while others are multi-player games. In the case of multi-player games, which are growing in popularity due at least in part to the social interaction that they afford, players typically must access a game server at the same time to initiate a game. This requirement can make it difficult for friends to participate in a multi-player game together.

Social networking websites such as Facebook provide a convenient way for friends to interact online. However, to participate in a multi-player game together, friends typically must leave their feed streams to play the game on a separate canvas.

It is in this context that embodiments arise.

SUMMARY

In an example embodiment, a method for displaying an online game in a content stream is provided. In this method, a website logon is received from a user of a computing device and a profile associated with the logon is retrieved. The content stream associated with the profile is displayed in a graphical user interface presented by the computing device. The content stream includes multiple views associated with different games that are multiplayer online games. The view associated with a first game is updated in response to an event recognized by the game mechanics model of the first game. The view associated with the first game is relocated to a location of prominence in the content stream, if user data associated with the user who logged on to the website indicates that the user is a participant of the first game.

In one embodiment, the relative location of the view associated with the first game is maintained within the content stream, if the user data associated with the user who logged on to the website indicates that the user is a spectator of the first game.

In one embodiment, the graphical user interface is associated with a social networking website. In one embodiment, the content stream is a content feed displayed by a social networking website. In one embodiment, the computing device is a smartphone.

In one embodiment, the view associated with a game includes the current state of the game board, the players participating in the game, and an indication as to which player is to take the next turn or to make the next move. In one embodiment, the view associated with the game further includes the current score of the game. In one embodiment, the view associated with the game also includes comments provided by players participating in the game or by spectators of the game.

In one embodiment, the event recognized by the game mechanics model of the first game is a game move, a change in the score of the game, or a comment regarding the game.

In another example embodiment, a computer program embedded in a non-transitory computer-readable storage medium is provided. The computer program, when executed by one or more processors, causes an online game to be displayed in a content stream. The computer program includes program instructions for receiving a website logon from a user of a computing device and for retrieving a profile associated with the logon. The computer program also includes program instructions for displaying a content stream associated with the profile in a graphical user interface presented by the computing device. The content stream includes multiple views associated with different games that are multiplayer online games. The computer program further includes program instructions for updating the view associated with a first game in response to an event recognized by the game mechanics model of the first game. Additionally, the computer program includes program instructions for relocating the view associated with the first game to a location of prominence in the content stream, if user data associated with the user who logged on to the website indicates that the user is a participant of the first game.

In one embodiment, the computer program also includes program instructions for maintaining the relative location of the view associated with the first game within the content stream, if the user data associated with the user who logged on to the website indicates that the user is a spectator of the first game.

In yet another example embodiment, another method for displaying an online game in a content stream is provided. In this method, a website logon is received from a user of a computing device and a profile associated with the logon is retrieved. The content stream associated with the profile is displayed in a graphical user interface presented by the computing device. The content stream includes multiple views associated with different games that are multiplayer online games. The view associated with a first game is updated in response to an event recognized by the game mechanics model of the first game. Next, the view associated with the first game is relocated to a location of prominence in the content stream based on the event. In one embodiment, the view associated with the first game is relocated to the location of prominence in the content stream when the event recognized by the game mechanics model of the first game is a game move.

Other aspects and advantages of the inventions will become apparent from the following detailed description, taken in conjunction with the accompanying drawings, which illustrate by way of example the principles of the inventions.

DETAILED DESCRIPTION

In the following description, numerous specific details are set forth in order to provide a thorough understanding of the exemplary embodiments. However, it will be apparent to one skilled in the art that the example embodiments may be practiced without some of these specific details. In other instances, process operations and implementation details have not been described in detail, if already well known.

The example embodiments described below involve gamelets. One might consider a gamelet as including three components: 1) a model; 2) a view; and 3) a controller. The gamelet model handles the game-specific logic resulting from implementation of the game mechanics. In an example embodiment, the model might be part of the game management software or be supplied by game studios, e.g., using a software development kit (SDK). The SDK can include a structured data format. In an example embodiment, the structured data format might be JavaScript Object Notation (JSON). Also in an example embodiment, the gamelets developed using the SDK might be hosted on the hardware and software infrastructure described below to guarantee uptime and speed. The gamelet view renders the current state of the game board, e.g., the players involved, the current score, the player to make the next move, etc. In an example embodiment, the gamelet controller might be a JavaScript controller that sends messages to a php controller. It will be appreciated that the controller is responsible for handling user input and updating the model. For instance, when a player clicks on a game board to make a move, the JavaScript controller will determine whether the move is valid according to the game mechanics, and send the move to the php controller. The php controller will do additional verification according to the game mechanics, and send the move to the gamelet model for application of the game-specific logic.

Figures 1, 2:
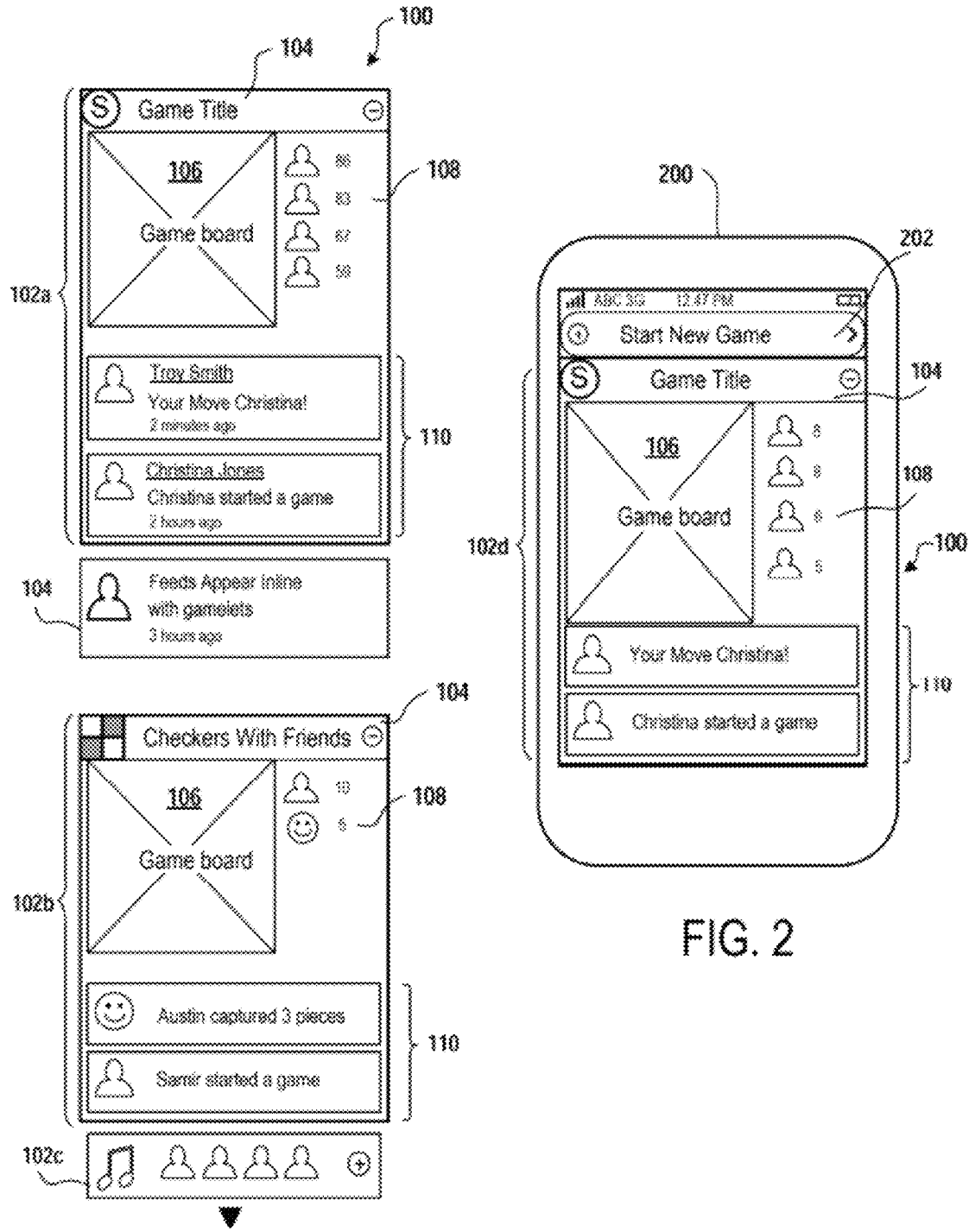
FIG. 1 is a simplified diagram that illustrates a content stream including gamelets, in accordance with an example embodiment.
FIG. 2 shows a smartphone that is displaying a content stream including a gamelet, in accordance with an example embodiment.

FIG. 1 is a simplified diagram that illustrates a content stream including gamelets, in accordance with an example embodiment. As shown in FIG. 1, content stream 100 includes gamelets 102a, 102b, and 102c. As used in this disclosure, a "gamelet" refers to a graphical user interface (GUI) supported by a game mechanics model. It will be appreciated that a gamelet's view is controlled by game management software that stores the game mechanics model in volatile storage, e.g., RAM, and/or persistent storage, e.g., a database. It will be further appreciated that the gamelet's view will be displayed by a browser running on a client device, e.g., a smartphone, a tablet computer, or a personal computer, based on instructions received from the game management software. In another embodiment, the gamelet could be a native application for a smartphone, e.g., an iPhone device or an Android device. Content stream 100 also includes feeds 104, e.g., content posts from persons associated with a user through a social graph or an access control list (ACL), which are displayed inline with the gamelets in the content stream. Content stream 100 may be a stream associated with a social networking website, e.g., a Facebook news feed, a Google+ stream, a Twitter timeline, etc., or a stream associated with a gaming website, e.g., Zynga.

As shown in FIG. 1, gamelet 102a includes title bar 104, game board 106, scoreboard 108, and comments section 110. Title bar 104 is a graphical user interface (GUI) widget that includes suitable buttons or icons to enable users to minimize or maximize the view of gamelet 102a within the content stream. Title bar 104 also displays the title of the game and, if desired, an icon associated with the game. Game board 106 is a rendering of the current state of the game board. In the example of FIG. 1, game board 106 is rendered in a spectator view. Game board 106 also can be rendered in an expanded player view, as described in more detail below with reference to FIG. 4. Scoreboard 108 shows the scores of the players participating in the game. The players may be identified by a picture, e.g., a thumbnail image associated with a profile for a social networking website, an avatar, or other suitable symbol. In the example of FIG. 1, scoreboard 108 shows the players ranked by score from the highest score to the lowest score; however, it will be appreciated that scoreboard 108 may display the players in any desired order. Comments section 110 displays comments regarding gamelet 102a. The comments regarding the gamelet may be made in a text box by either participants or spectators of the game in the same manner that comments are posted in content streams. In addition, comments can be automatically generated by game management software for display in the gamelet, as will be described in more detail below.

With continuing reference to FIG. 1, gamelet 102b is displayed in content stream 100 below feeds 104. As shown in title bar 104 of gamelet 102b, this gamelet shows a view of the game having the title "Checkers with Friends," although it will be appreciated that game board 106 shown in FIG. 1 does not show a rendering of the actual game board for this game. Title bar 104 of gamelet 102b also includes a checkerboard icon displayed adjacent to the title of the game. In the comments section 110 of gamelet 102b, two comments are shown: 1) "Austin captured 3 pieces;" and 2) "Samir started a game." Each of these comments is generated automatically by the game management software based on events that take place during the game and is written for display in the gamelet, e.g., in a text box. In the event comments are made by participants or spectators of the game, such comments would be displayed in comments section 110 of gamelet 102b along with the comments automatically generated by the game management software.

Gamelet 102c is displayed in content stream 100 below gamelet 102b. In the example of FIG. 1, gamelet 102c is a minimized view of the gamelet in the content stream. This minimized view of gamelet 102c includes a music note icon, a number of thumbnail images, and a "+" button. The music note icon is the icon associated with gamelet 102c and serves to identify the gamelet. It will be appreciated that each gamelet can be assigned an icon that identifies the gamelet. The thumbnail images shown in the minimized view of gamelet 102c identify the participants of the game. It will be appreciated that the participants of the game may be identified in any other suitable manner, e.g., with an avatar or other symbol. The "+" button enables users to change the view of gamelet 102c within content stream 100 to a maximized view. It will be appreciated that any suitable graphical user interface (GUI) widget can be used to enable users to change the view of gamelet 102c displayed within content stream 100.

FIG. 2 shows a smartphone that is displaying a content stream including a gamelet, in accordance with an example embodiment. As shown in FIG. 2, smartphone 200 is displaying content stream 100, which includes gamelet 102d, in a GUI presented by the smartphone. GUI widget 202, e.g. a button, is also displayed on the screen of smartphone 200. The GUI widget 202 enables a user to access a start menu that can be used to start a new game, as described in more detail below with reference to FIG. 3. As shown in the example of FIG. 2, for ease of illustration, only one gamelet, i.e., gamelet 102d, is visible on the screen of smartphone 200. It will be appreciated that content stream 100 can include multiple gamelets, and that the user of smartphone 200 can scroll to see any gamelets located below the scroll of the screen of the smartphone. As shown in FIG. 2, gamelet 102d also includes title bar 104, game board 106, scoreboard 108, and comments section 110, each of which is described above with reference to FIG. 1.

Figure 3:
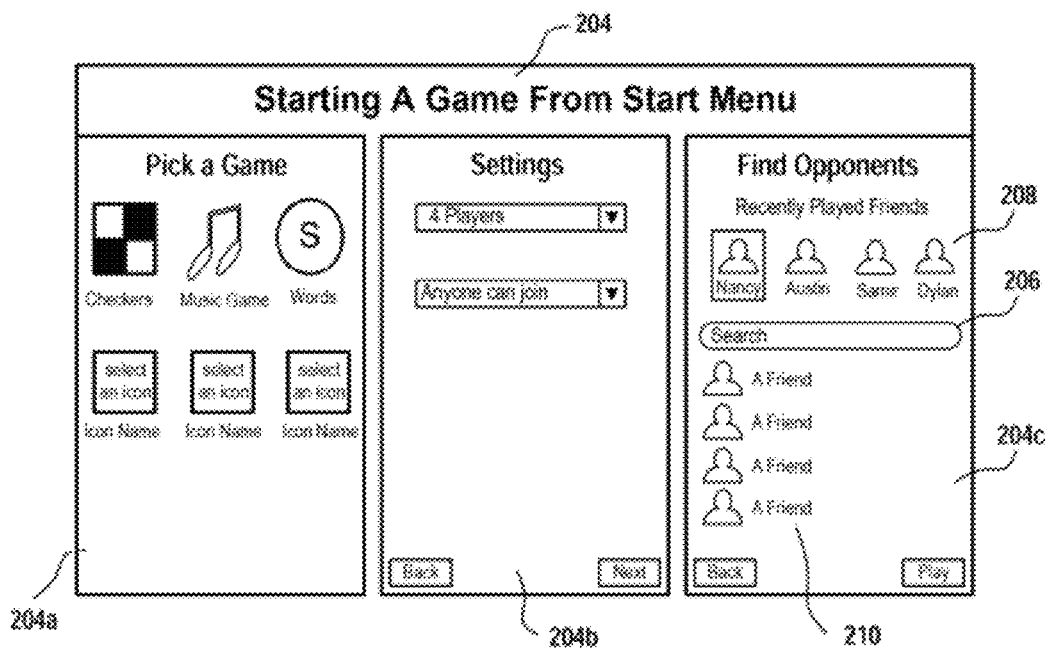
FIG. 3 is a simplified diagram that illustrates a start menu view for starting a game, in accordance with an example embodiment.

FIG. 3 is a simplified diagram that illustrates a start menu view for starting a game, in accordance with an example embodiment. As shown in FIG. 3, start menu view 204 includes game selection view 204a, settings view 204b, and opponent search view 204c. Game selection view 204a enables a user to pick a game to be played by clicking on an icon associated with the game. For example, to start a game of "Checkers with Friends," a user can click on the checkerboard icon shown in game selection view 204a. Settings view 204b enables a user to select the settings for the game, e.g., the number of players, whether the game is public or private, etc. To enable a user to select the desired settings, settings view 204b can include suitable GUI widgets, e.g., drop down menus and radio buttons. Opponent search view 204c enables a user to find opponents to play in the game. As shown in FIG. 3, opponent search view 204c includes search box 206 to enable a user to search for a friend to play in the game. Opponent search view 204c also displays list 208 of recently played friends, which can be identified by a thumbnail image, an avatar, or other suitable symbol. To start a game against a recently played friend, a user can click on the thumbnail image (or other symbol) that identifies the desired friend. In addition, opponent search view 204c includes a listing 210 of suggested friends to play in the game. By way of example, listing 210 of suggested friends can be generated by analyzing friends associated with a user through a social graph. For example, the listing of suggested friends can be generated using online presence (whether or not other friends are currently online using a particular web site), using the skill level demonstrated by other friends based on their current game playing history, or using the game preferences of other friends based on the games that they play most often.

Figure 4:
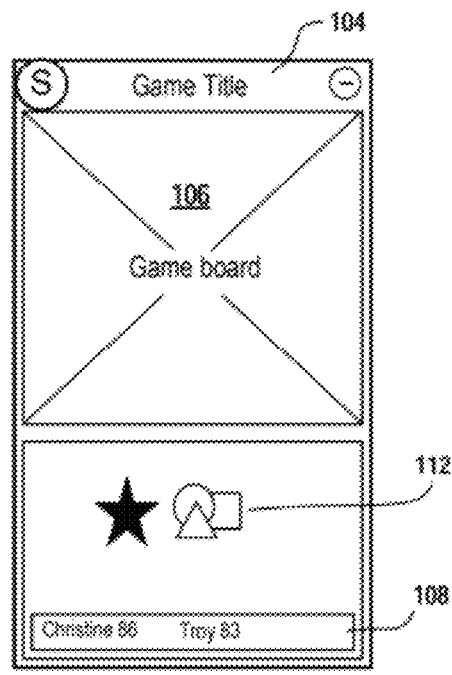
FIG. 4 is a simplified diagram that illustrates an expanded player view of a game board, in accordance with an example embodiment.

FIG. 4 is a simplified diagram that illustrates an expanded player view of a game board, in accordance with an example embodiment. As shown in FIG. 4, the expanded player view includes a view of game board 106 that is expanded relative to the view of the game board when rendered in a spectator view (see FIG. 1). In one example, the expanded player view of game board 106 extends across the entire width of the screen. The expanded player view also includes controls 112 that enable a player to make a move in the particular game being played. It will be understood that the functionality of controls 112 will vary to meet the needs of each particular game. In the example shown in FIG. 4, the view of scoreboard 108 is rendered such that the scoreboard is situated below controls 112 and the scores are displayed across the screen in a horizontal arrangement. It will be understood that the view of scoreboard 108 can be omitted from both the expanded player view and the spectator view for games in which keeping a score is not necessary.

Figure 5:
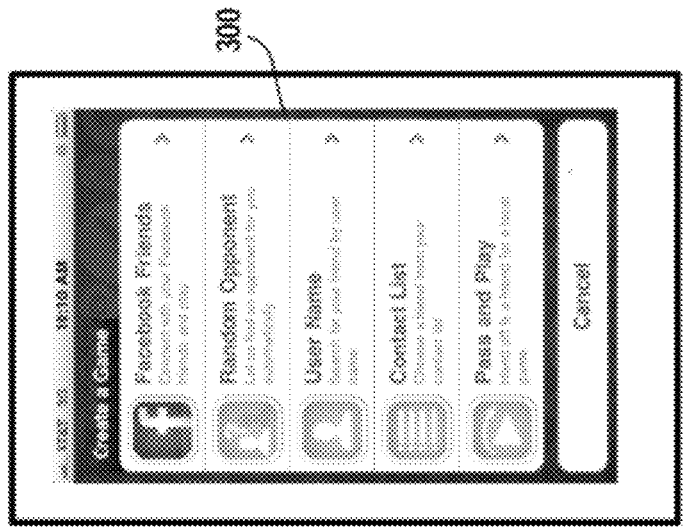
FIG. 5 is a view that enables a player to find an opponent to create a game, in accordance with an example embodiment.

FIG. 5 is a view that enables a player to find an opponent to create a game, in accordance with an example embodiment. As shown in FIG. 5, view 300 includes five GUI widgets, e.g., buttons, that provide a player with five options for finding an opponent to create a game. The first option enables a player to find an opponent by connecting with friends from a social networking website, e.g. Facebook, to create a game. In accordance with the second option, an opponent is automatically selected for the player. The third option enables a player to search for an opponent by user name. The fourth option enables a player to choose an opponent from his or her contact list. In accordance with the fifth option, a player can engage in a local "pass and play" game in which a single device, e.g., a smartphone, is handed back and forth between two players. In addition, players can tag friends, e.g., Bob is playing the game "Risk" with Tom and Charles.

Figure 7:
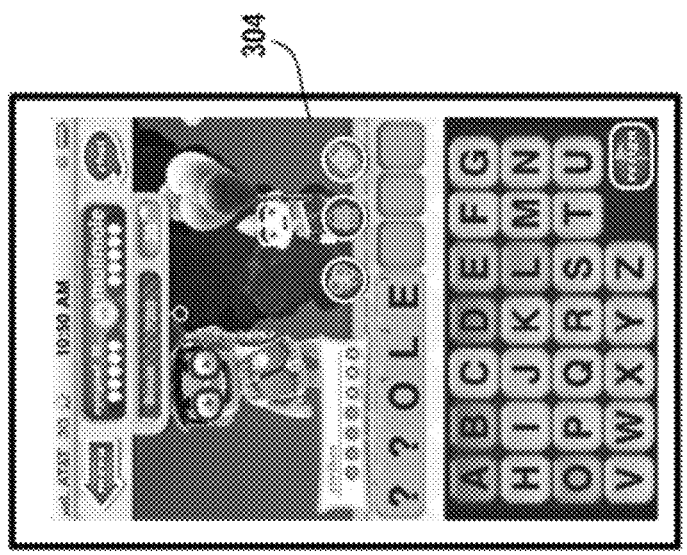
FIG. 7 is a view that illustrates the state of the game shown in FIG. 6 after Player B has engaged in some game play.
Figure 6:
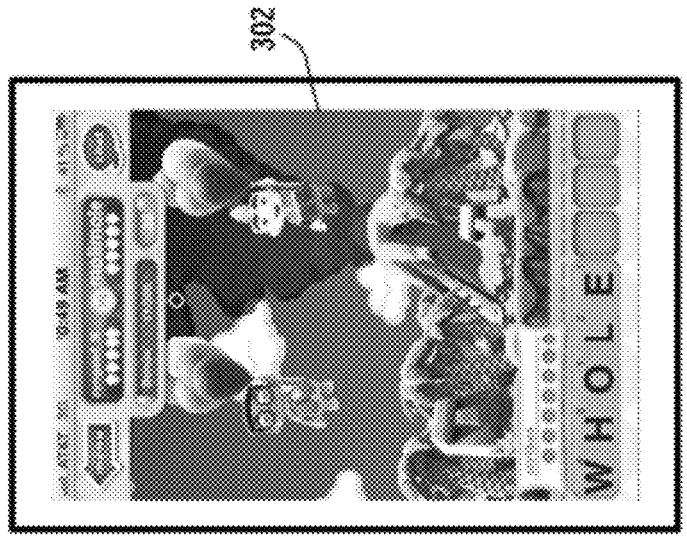
FIG. 6 is a view that illustrates a game parameter being defined at the start of a game, in accordance with an example embodiment.

FIG. 6 is a view that illustrates a game parameter being defined at the start of a game, in accordance with an example embodiment. As shown in FIG. 6, the view associated with gamelet 302 illustrates the start of a game called "Hanging with Friends." In accordance with the game mechanics of "Hanging with Friends," one player, e.g., Player A, selects a word to be guessed by the other player, e.g., Player B. In the example of FIG. 6, Player A has selected the word "WHOLE" as the word to be guessed by Player B. FIG. 7 is a view that illustrates the state of the game shown in FIG. 6 after Player B has engaged in some game play. As can be seen in the view associated with gamelet 304, by correctly guessing certain letters and being given the last vowel in the word for free (in accordance with the mechanics of the game), Player B has ascertained that the word puzzle includes the letters "O," "L," and "E." On the other hand, Player B has accumulated three strikes by incorrectly guessing that the word puzzle includes the letters "A," "B," and "D."

Figure 8:
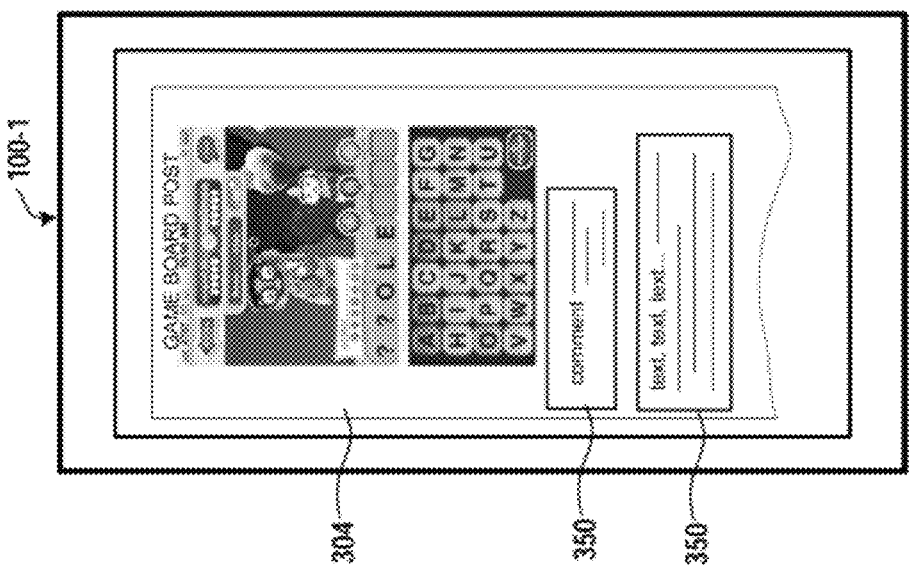
FIG. 8 is a simplified diagram that illustrates a view of a content stream including a gamelet, in accordance with an example embodiment.

FIG. 8 is a simplified diagram that illustrates a view of a content stream including a gamelet, in accordance with an example embodiment. As shown in FIG. 8, the view associated with gamelet 304 is displayed in content stream 100-1 associated with a user profile, e.g., by an HTML5-enabled browser or an Adobe Flash-enabled browser that has received instructions from a server running game management software using an M-V-C (model-view-controller) architecture where the model includes the game mechanics of the game being played. Content stream 100-1 also includes content posts 350, which may be either user-generated content (UGC) in the form of text, images, music, video, etc. or third-party generated content, e.g., advertisements, in the form of text, images, music, video, etc.

Figure 10:
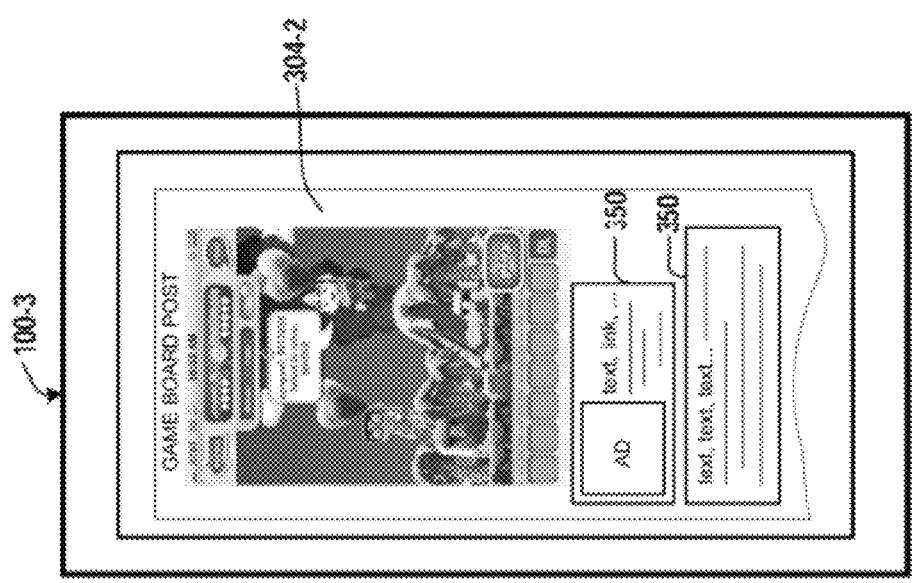
FIG. 10 illustrates a view of the content stream after the gamelet has been relocated in the content stream.
Figure 9:
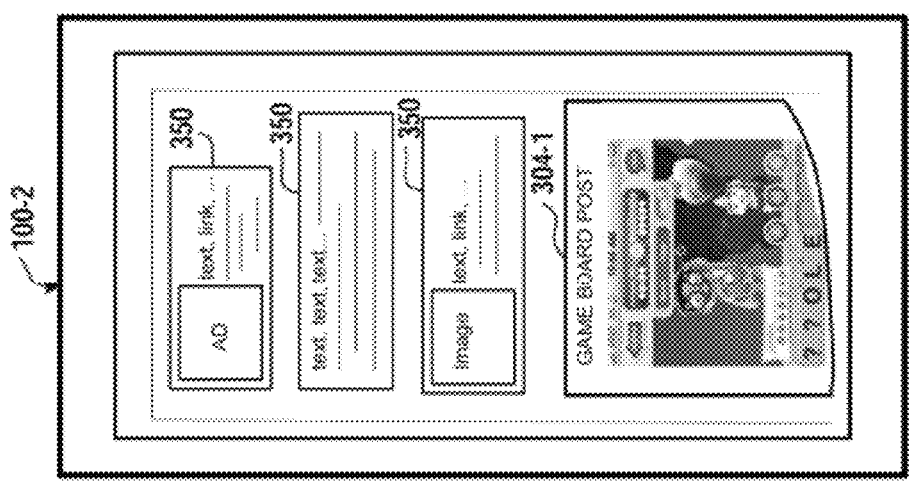
FIG. 9 is a simplified diagram that illustrates a view of the content stream shown in FIG. 8 after content posts have been added to the content stream.

FIG. 9 is a simplified diagram that illustrates a view of the content stream shown in FIG. 8 after content posts have been added to the content stream. As shown in FIG. 9, gamelet 304-1 has been relocated in content stream 100-2 because of the addition of more recent content posts 350. As gamelet 304-1 progresses in content stream 100-2, the view associated with gamelet 304-1 is updated to reflect the current state of the game, as will be described in more detail below with reference to FIG. 12. FIG. 10 illustrates a view of the content stream after the gamelet has been relocated in the content stream. As shown in FIG. 10, gamelet 304-2 has been relocated to a location of prominence in content stream 100-3. In this example, gamelet 304-2 has been relocated to the top of content stream 100-3. In another example, the location of prominence to which the gamelet is relocated could be any location disposed above the "scroll" of the content stream as displayed by the GUI in the web browser of the user's computing device, e.g., a smartphone. The gamelet can be relocated to a location of prominence whenever an event that is considered to be significant takes place in the game. The determination as to whether an event is considered to be significant can vary depending upon whether the gamelet is in spectator view or the expanded player view. In the expanded player view, the gamelet can be relocated to a location of prominence whenever the state of the game changes, e.g., when a game move is made, when the score changes, when a comment regarding the game is added, or when the game ends. In the spectator view, the gamelet can be relocated to a location of prominence less frequently, e.g., only when a comment regarding the game is added or the game ends. In the example of FIG. 10, gamelet 304-2 has been relocated to the top of content stream 100-3 because Player B failed to solve the word puzzle and, consequently, the game ended.

Figures 11, 12, 13:
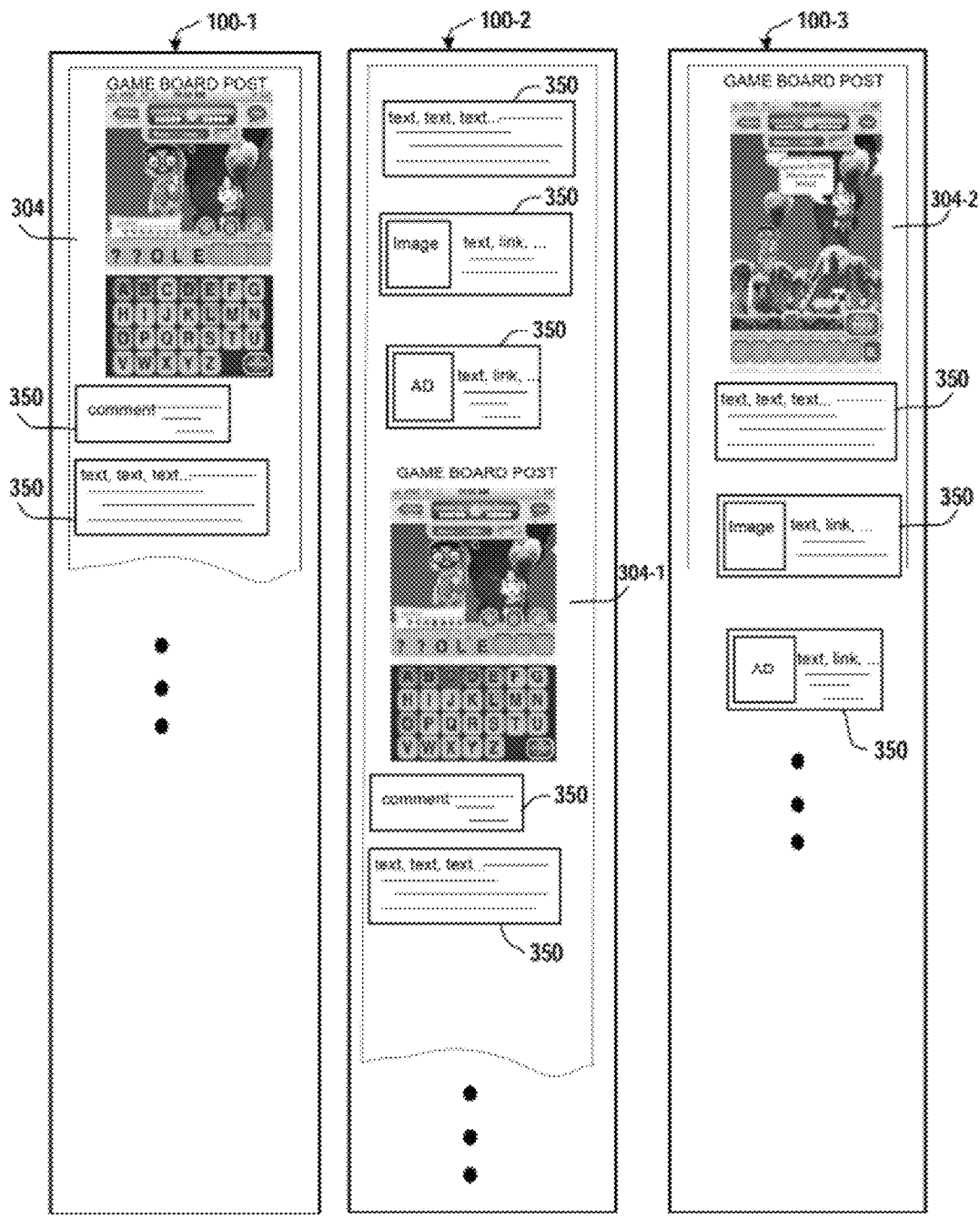
FIGS. 11-13 are simplified diagrams that illustrate how a gamelet is updated as the gamelet progresses in the content stream, in accordance with an example embodiment.

FIGS. 11-13 are simplified diagrams that illustrate how a gamelet is updated as the gamelet progresses in the content stream. FIG. 11 shows a view of content stream 100-1, which includes gamelet 304 and content posts 350 (the view of content stream 100-1 corresponds to that shown in FIG. 8). FIG. 12 shows a view in which gamelet 304-1 has been relocated in content stream 100-2 because of the addition of more recent content posts 350 (the view of content stream 100-2 corresponds to that shown in FIG. 9). As the gamelet progresses in the content stream, the view of the gamelet is updated to reflect the current state of the game. As shown in FIG. 12, the view of gamelet 304-1 has been updated to show that Player B has just incorrectly guessed that the word puzzle includes the letter "C." Accordingly, because Player B had already incorrectly guessed that the word puzzle includes letters "A," "B," and "D" (see FIG. 11), the view of gamelet 304-1 shown in FIG. 12 indicates that Player B has incorrectly guessed that the word puzzle includes letters "A," "B," "C," and "D." FIG. 13 shows a view in which gamelet 304-2 has been relocated to the top of content stream 100-3 (the view of content stream 100-3 corresponds to that shown in FIG. 10). As described above with reference to FIG. 10, gamelet 304-2 has been relocated to the top of content stream 100-3 because a significant event took place in the game.

Figure 14:
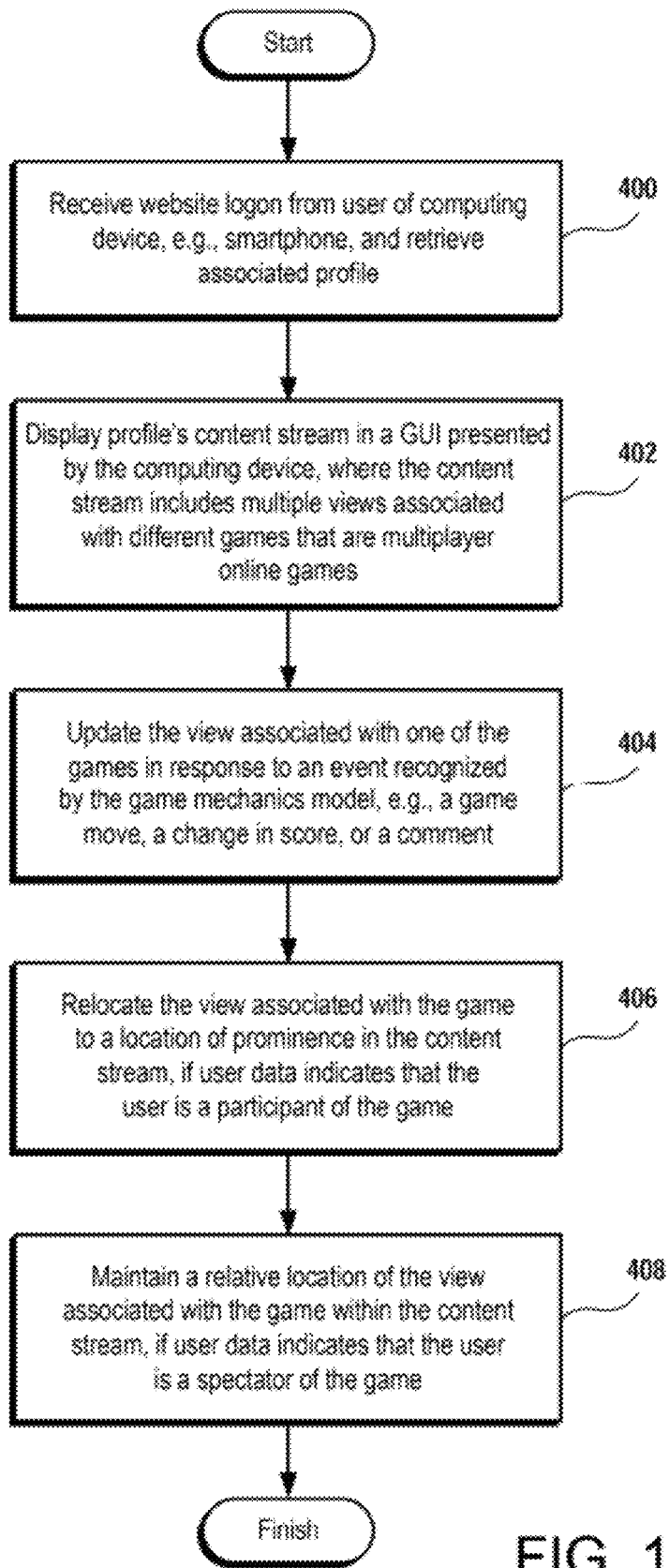
FIG. 14 is a flowchart diagram illustrating the method operations performed by game management software in displaying an online game in a content stream, in accordance with an example embodiment.

FIG. 14 is a flowchart diagram illustrating the method operations performed by game management software in displaying an online game in a content stream, in accordance with an example embodiment. In operation 400, a website logon is received from a user of a client computing device, e.g., a smartphone, e.g., an iPhone device or an Android device, a personal computer (PC), e.g. a laptop computer or a desktop computer, or a tablet computing device, e.g., an iPad device, and a profile associated with the logon is retrieved. In operation 402, a content stream associated with the profile is displayed in a graphical user interface (GUI) presented by the computing device. In one embodiment, the GUI is associated with a social networking website, e.g., Facebook, and the content stream is a content feed, e.g., a Facebook news feed, displayed by the social networking website. In another embodiment, the GUI is implemented on a website, e.g. Zynga Direct, that has direct control of the GUI. In one embodiment, the content stream includes multiple views associated with different games that are multiplayer online games. In one example embodiment, the content stream includes views of at least a first multiplayer online game, e.g., "Hanging with Friends," and a second multiplayer online game, e.g., "Checkers with Friends" (although it will be appreciated that there is no limit on the number of different games that can be included in the content stream). The view associated with each of the games can include one or more of the current state of the game board, the players participating in the game, the current score of the game, comments regarding the game, and an indication as to which player is to take the next turn or make the next move. In operation 404, the view associated with one of the games is updated in response to an event recognized by the game mechanics model of the game, e.g., a game move, a change in score, a comment regarding the game, or the end of the game.

In operation 406, the view associated with one of the games is relocated to a location of prominence in the content stream, if user data indicates that the user is a participant of the game. In one example embodiment, the location of prominence in the content stream is the top of the content stream. In another example embodiment, the location of prominence in the content stream is any location disposed above the "scroll" of the content stream as displayed by the GUI in the web browser of the user's computing device. In operation 408, a relative location of the view associated with the game is maintained within the content stream, if the user data indicates that the user is a spectator of the game. The rationale for operation 408 is that spectators of a game might not be interested in receiving frequent updates regarding the status of the game. Thus, when the content stream is associated with a user who is a spectator of the game, the view associated with the game is relocated in the content stream less frequently than for a user who is a participant of the game. For spectators of the game, the game events for which the view associated with the game is relocated in the content stream can be determined on a game-by-game basis. It is to be understood that when the relative location of the view associated with the game is maintained within the content stream, the view associated with the game does not remain in a fixed location, but rather progresses in the stream in the same manner that the other content posts progress in the stream. It will be appreciated that the relative locations in a content stream are ordered on the basis of recency, e.g., the most recent item of content is displayed at the top of the stream. It will be further appreciated that relocation to a location of prominence alters this typical ordering of the stream.

Figure 15:
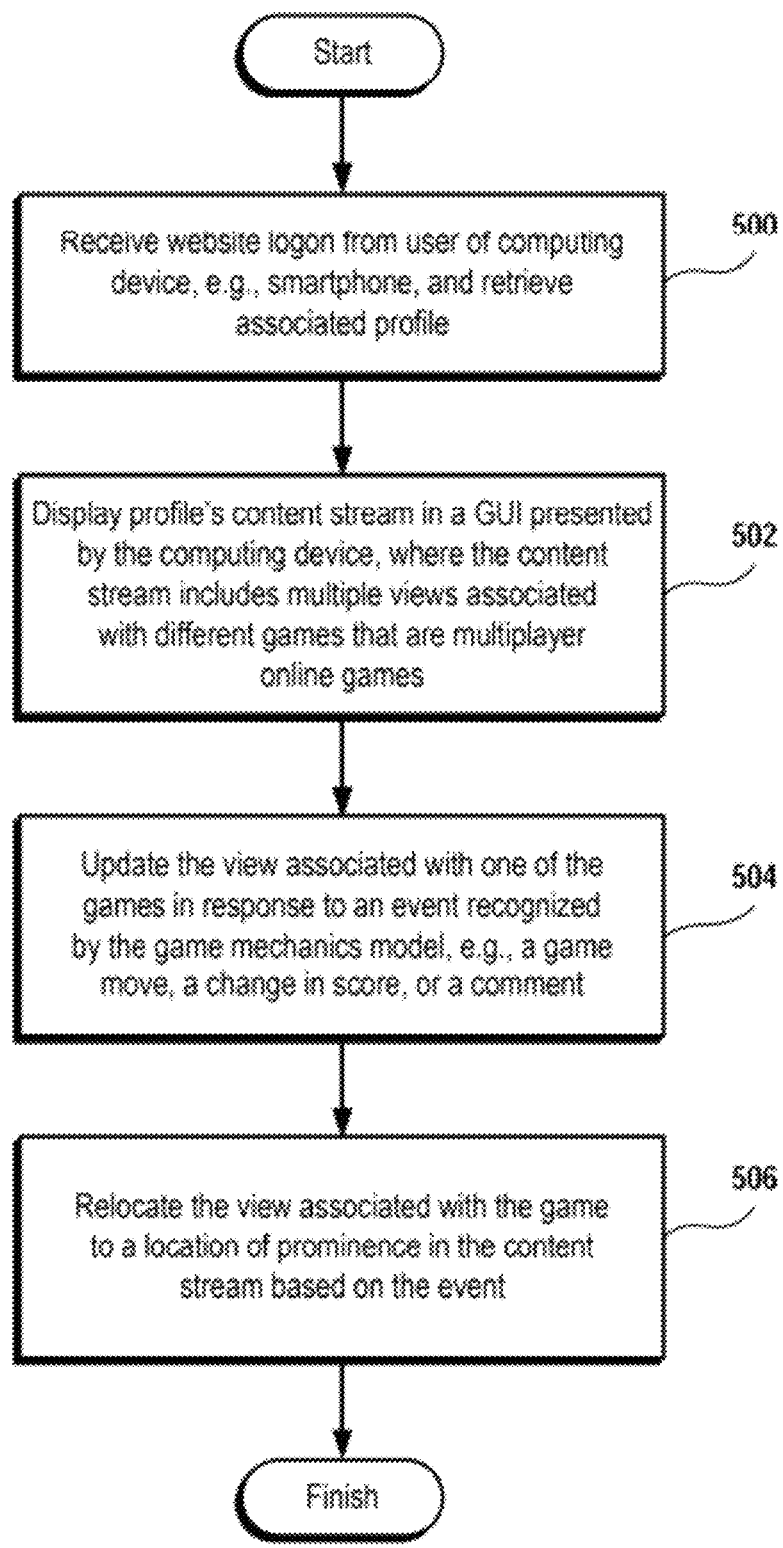
FIG. 15 is a flowchart diagram illustrating the method operations performed by game management software in displaying an online game in a content stream, in accordance with another example embodiment.

FIG. 15 is a flowchart diagram illustrating the method operations performed by game management software in displaying an online game in a content stream, in accordance with another example embodiment. In operation 500, a website logon is received from a user of a client computing device, e.g., a smartphone, e.g., an iPhone device or an Android device, a personal computer (PC), e.g. a laptop computer or a desktop computer, or a tablet computing device, e.g., an iPad device, and a profile associated with the logon is retrieved. In operation 502, a content stream associated with the profile is displayed in a graphical user interface (GUI) presented by the computing device. In one embodiment, the GUI is associated with a social networking website, e.g., Facebook, and the content stream is a content feed e.g., a Facebook news feed, displayed by the social networking website. In one embodiment, the content stream includes multiple views associated with different games that are multiplayer online games. The view associated with each of the games can include one or more of the current state of the game board, the players participating in the game, the current score of the game, comments regarding the game, and an indication as to which player is to take the next turn or make the next move. In operation 504, the view associated with one of the games is updated in response to an event recognized by the game mechanics model, e.g., a game move, a change in score, a comment regarding the game, or the end of the game.

In operation 506, the view associated with one of the games is relocated to a location of prominence in the content stream based on the event recognized by the game mechanics model. As described above, the gamelet can be in either spectator view or the expanded player view, depending upon whether the user is a spectator or a participant of the game. The view of the game can be relocated to a location of prominence whenever the event recognized by the game mechanics model is considered to be significant to the user. The determination as to whether an event is considered to be significant to the user can vary depending upon whether the user is a spectator or participant of the game. If the user is a participant of the game, the view of the game can be relocated to a location of prominence whenever the state of the game changes, e.g., when a game move is made, when the score changes, when a comment regarding the game is added, or when the game ends. If the user is a spectator of the game, the view of the game can be relocated to a location of prominence less frequently, e.g., only when a comment regarding the game is added or the game ends.

Figure 16:
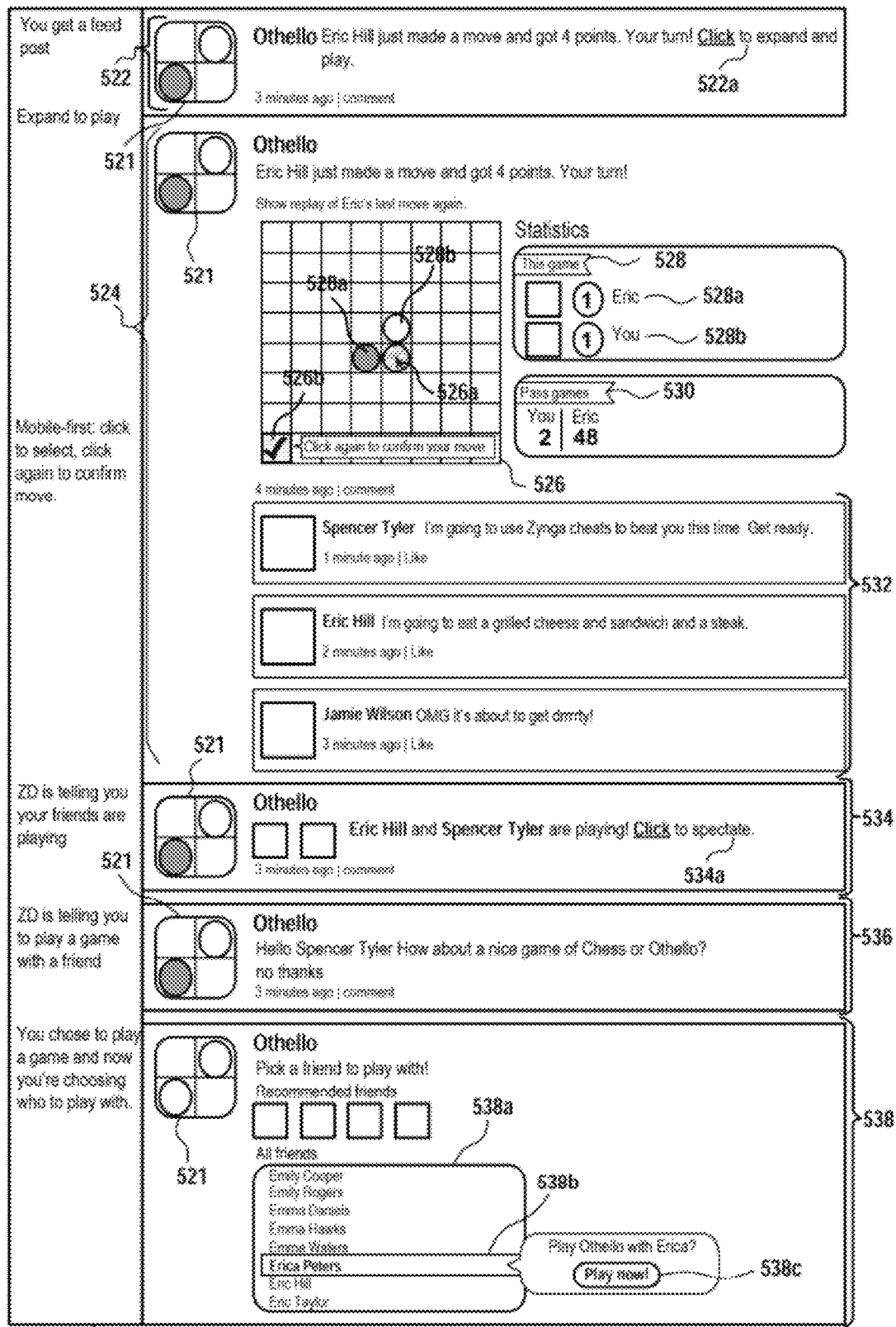
FIG. 16 is a simplified diagram that illustrates a view of a content stream including a gamelet, when implemented on a website designed to facilitate social gaming, in accordance with an example embodiment.

FIG. 16 is a simplified diagram that illustrates a view of a content stream including a gamelet, when implemented on a website designed to facilitate social gaming, in accordance with an example embodiment. For example, the social game can be executed through a website that enables social interaction between friends in a social network, when in communication with the website. In one embodiment, the gamelet can be implemented on a website that allows for direct play of games without integration into a social network interface. For example, instead of integrating the game play into a window of a social networking website, such as Facebook, the game play would be facilitated directly through the website. In one embodiment, the website, for purposes of illustration, could be executed by a company, e.g., Zynga Inc. The company would allow for direct play of games through its websites (e.g., for online distribution of game services). In this configuration, the platform can enable direct relationships with consumers whether on traditional computing devices, e.g. PC's, or mobile computing devices, e.g., smartphones.

As shown in FIG. 16, box 520 explains various functionalities illustrated during the social interaction between friends, while playing an interactive game in a content stream. Referring to box 520, the topmost section 522 of the view of the content stream displayed by a GUI presented by a computing device includes an icon 521 of a particular game (Othello) being played from the perspective of a person who is logged on to the website (in this example, the person is Spencer Tyler). As illustrated in FIG. 16, the person to which the content stream is presented (Spencer Tyler) is referred to as "YOU." In the content stream, information about the game called "Othello" is provided in section 522, which indicates that Eric Hill, who is a friend of YOU, just had some activity while playing Othello. As generated by the game management software, an option to click on link 522a is provided to the user YOU. If the user YOU clicks on link 522a, the user will be provided with an expanded view of the game play, as shown in section 524. In section 524, a view of a game session 528 and data regarding past games 530 between the friend Eric 528a and the user YOU 528b is displayed. In the game board 526 provided directly in the content stream, the user YOU 528b is shown interactively moving a game piece 526a and is provided with an option to confirm the move by selecting the checkbox 526b. In one embodiment, the user would be allowed to click once to make a game move, and then to click again to confirm a move, as indicated in box 520. As shown, during the interactive game play between user YOU 528b and Eric 528a, the game players as wells as friends of user YOU 528b are allowed to comment on the game activity that is ongoing, as shown in comment section 532.

As further shown in FIG. 16, the content stream can include information regarding the activities of other friends, as shown in section 534. In this example, section 534 would allow user YOU 528b to click on link 534a and become a spectator of the game of "Othello" being played by Eric Hill and Spencer Tyler. In section 536, the gaming system (via the game management software) can also make posts to the content stream to invite user YOU 528b to play other games with friends of the user. In section 538, user YOU 528b, after being invited by the system to play game with others, can select a particular friend to play with via selection window 538a. Within selection window 538a, user YOU 528b can then select a particular friend 538b from the list displayed in the selection window, and then click on the "play now" button 538c to begin a game.

As the example of FIG. 16 illustrates, a content stream can provide interactive game play for a user with one or more friends of the user, which may be part of the user's social network. The user's social network need not be part of an existing social network, but can be dynamically constructed from contact information provided by user. The contact information can include, by way of example, e-mail addresses, text IDs, instant messaging names, telephone numbers, and other message protocol identifiers. In yet another embodiment, the social network can be constructed by accessing part of a social network, or by accessing data from a plurality of social networks operated by various entities. Once the social network data has been accessed, users wishing to interact with their friends, or a subset of friends, can share gaming experiences in a content stream format, which will not only allow games to be played within the content stream but also allow friends to comment on the game or interact with others during game play.

During the course of game play, the view of the gamelet shown in FIG. 16 can be relocated to a location of prominence in the content stream whenever an event that is considered to be significant takes place in the game, as described above with reference to, for example, FIGS. 8-10. In one embodiment, when the device platform is a tablet computing device, e.g., an iPad device and the posts in the content stream are displayed in a horizontal manner, e.g., when the tablet device is rotated, the location of prominence can be either the left side or the right side of the content stream, depending upon the direction in which the content stream progresses as content posts are added. In addition, the view of the gamelet shown in FIG. 16 can be updated as the gamelet progresses in the content stream, as described above with reference to, for example, FIGS. 11-13.

It will be appreciated that the view of the content stream shown in the example of FIG. 16 can be displayed by a GUI presented by a client computing device, e.g., a personal computer (PC), e.g. a laptop computer or a desktop computer, a tablet computing device, e.g., an iPad device, or a mobile computing device, e.g., a smartphone, e.g., an iPhone device or an Android device.

Figure 17:
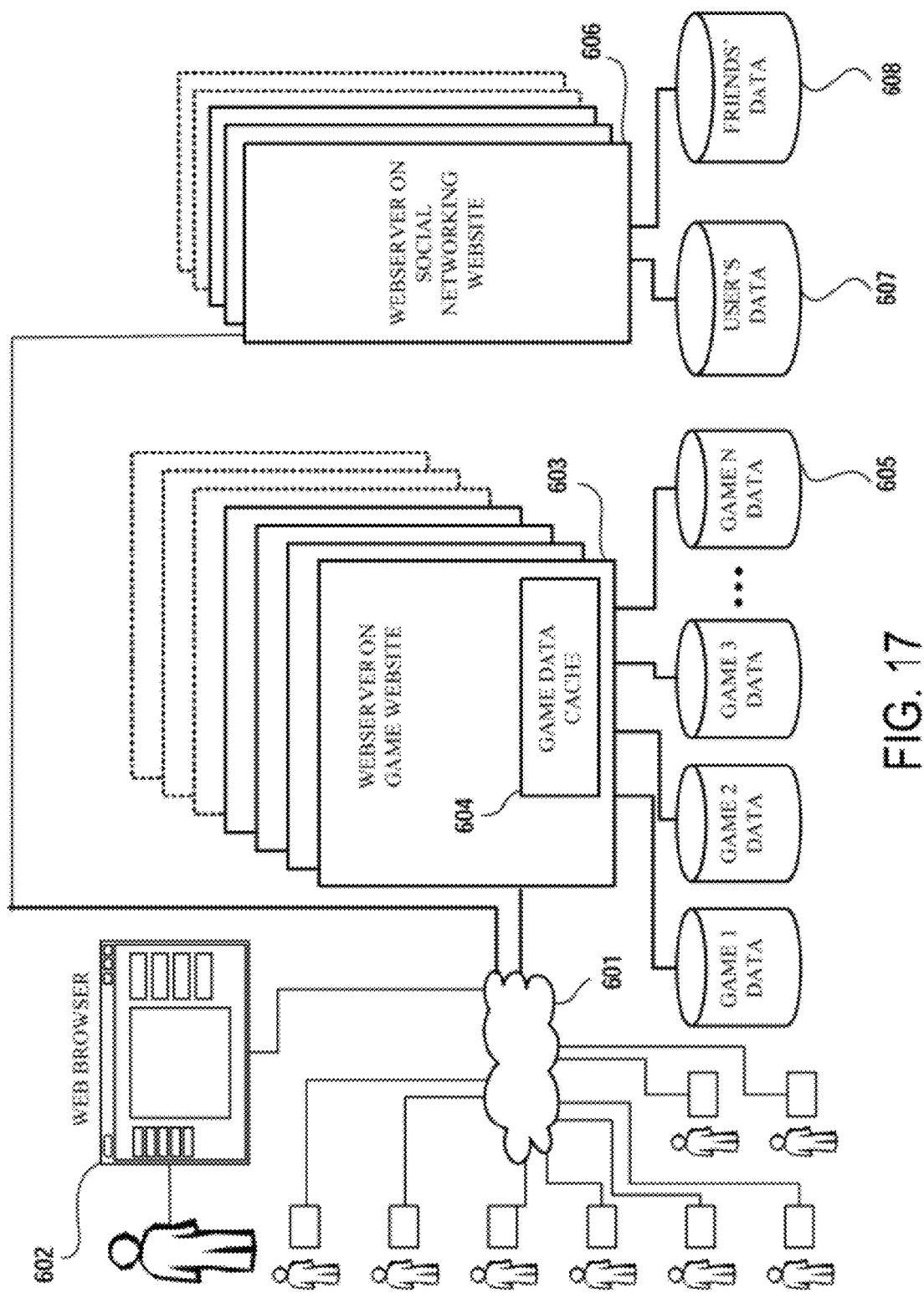
FIG. 17 is a simplified diagram that illustrates a network for a social game, in accordance with an example embodiment.

FIG. 17 is a simplified diagram that illustrates a network for a social game, in accordance with an example embodiment. As depicted in this figure, a personal computing device 602 is connected by a network 601 (e.g., a wide area network (WAN) including the Internet, which might be wireless in part or in whole) with a website 603 hosting a massively multi-player online game (e.g., a website such as Zynga hosting FarmVille or Blizzard Entertainment hosting World of Warcraft) and a website 606 hosting a social network (e.g., a social networking website such as Facebook or a social media website such as MySpace). The personal computing device 602 might be a laptop or other personal computer or a mobile device such as a smartphone, e.g., an iPhone device, Blackberry device, Android device, etc. In an example embodiment, each of the websites 603 and 606 might be composed of a number of webservers connected by a network (e.g., a local area network (LAN) or a WAN) to each other in a cluster or other distributed system which might execute cloud platform software as described in further detail below. The webservers in website 603 and 606 might also be connected (e.g., by a storage area network (SAN)) to persistent storage 605 and 607-608, respectively. In an example embodiment, persistent storage 605 and 607-608 might include a redundant array of independent disks (RAID).

Persistent storage 605 (e.g., the persistent storage associated with game N) might be used to store algorithms and data related to a game and its players, including data about the players received by website 603 from website 606. In an example embodiment, some of the data from persistent storage 605 might be cached in volatile memory in webservers on website 603 to improve performance. Persistent storage 607 might be used to store profile and associated stream data regarding the user of personal computing device 602. Similarly, persistent storage 608 might be used to store profile and associated stream data regarding persons (e.g., friends) associated with that user, e.g., through a social graph (or network). It will be appreciated that persistent storage 607 and persistent storage 608 might well be the same persistent storage. They have been depicted as separate here for purposes of illustration to emphasize that a user typically has greater access rights to his/her profile and stream data than to the profile and stream data of his/her friends.

In an example embodiment, personal computing device 602 might be a laptop or other personal computer. In that event, personal computing device 602 and the webservers in website 603 and 606 might include (1) hardware consisting of one or more microprocessors (e.g., from the x86 family or the PowerPC family), volatile storage (e.g., RAM), and persistent storage (e.g., a hard disk or solid-state drive), and (2) an operating system (e.g., Windows, Mac OS, Linux, Windows Server, Mac OS Server, etc.) that runs directly or indirectly (e.g., through virtualization software) on the hardware. Or the operating system for the webservers might be replaced by a hypervisor or other virtualization software. In an alternative example embodiment personal computing device 602 might be a mobile device that includes (1) hardware including one or more microprocessors (e.g., from the ARM family), volatile storage (e.g., RAM), and persistent storage (e.g., flash memory such as microSD) and (2) an operating system (e.g., Symbian OS, RIM BlackBerry OS, iPhone OS, Palm webOS, Windows Mobile, Android, Linux, etc.) that runs on the hardware.

Also in an example embodiment, personal computing device 602 might include a web browser as an application program or part of an operating system. Examples of web browsers that might execute on personal computing device 602 if it is a laptop or other personal computer include Internet Explorer, Mozilla Firefox, Safari, and Google Chrome. Examples of browsers that might execute on personal computing device 602 if it is a mobile device include Safari, Mozilla Firefox, Android Browser, and Palm webOS Browser. It will be appreciated that users of personal computing device 602 might use browsers to communicate with software running on the webservers at website 603 in an example in which the display of the content stream is controlled by the gaming website 603. In an alternative example embodiment, the display of the content stream might be controlled by social networking website 606 using data received from gaming website 603.

It will be appreciated that the description above uses Facebook as an example of a social networking website, in numerous instances. This use is intended to be illustrative, rather than limiting. Other social networking websites, such as Google+, might have been used instead of Facebook. Or the description might have used a social media website, such as MySpace. As previously noted, the term "social networking website" as used in this disclosure is to be broadly interpreted to include, for example, any website that allows its users to selectively access (e.g., according to a contact list, buddy list, social graph, etc.) each other's profiles and/or streams or selectively communicate (e.g., according to a contact list, buddy list, social graph, etc.) with each other.

In the examples described above, reference is made to "Checkers with Friends," "Hanging with Friends," and "Othello" as games that are suitable for implementation as gamelets. It will be appreciated that a variety of turn-based games are suitable for implementation as gamelets, e.g., Chess, Tic-tac-toe, Words with Friends, Battleship, Pictionary, 20 Questions, and Connect 4. It will further be appreciated that some or all of the process operations described in this disclosure might be applied to real-time strategy games in which all players play simultaneously.

In one embodiment, the gamelets can be configured to intelligently interface with different types of devices. When communication is executed through a particular type of device, such as smartphone, the system is configured to present the information in a manner that is formatted to be more efficient for that type of device. Likewise, the information can be automatically formatted for another type of device, such as a tablet device or a PC, if the users move from device to device during game play. Accordingly, the game state is shared and viewable across multiple form factors, making it possible to start a game on a mobile device, e.g. a smartphone, and later continue to play the game on another device, e.g., a tablet device or a PC.

In one embodiment, interfacing with the various games can be performed by unlocking features based on payment by the user. The user can affect payment in various manners, such as through the use of virtual currency, the purchase of additional tokens, the purchase of energy, and other types of transactions that allow for collection of payment. For example, if virtual currency is used, the virtual currency can be used in the same manner that coins or tokens are used in an arcade. For instance, the user would be prompted to pay to start the game, or pay to receive energy that facilitates or enables game play. In another embodiment, users can be prompted to pay virtual currency to unlock game features during game play, or to unlock additional games or mini-games. In still another embodiment, if particular games are presented for play, such games can be presented in a locked mode. If the games are presented in a locked mode, users are provided with functionality or prompts that enable payment of virtual currency to unlock such games. By presenting the various available games to the users during game play of a particular game, users will be motivated to explore and activate new games by payment of the associated virtual currency. As used herein, the phrase "virtual currency" refers to currency used in connection with an online game. The currency used in the game can be purchased by payment of real world money. In other embodiments, virtual currency can be obtained or traded for with other users during game play. In still other embodiments, virtual currency can be provided to the user as a reward for either winning a game or achieving particular tasks in a game.

The particular tasks can include achieving a particular goal within a game or achieving a game level higher than that of peers (friends) of the player, e.g., in a social networking environment.

Some portions of the disclosure describe algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like.

Furthermore, it is also convenient at times, to refer to certain arrangements of steps requiring physical manipulations of physical quantities as modules or code devices, without loss of generality. It should be borne in mind, however, that all of these and similar terms are to be associated with the appropriate physical quantities and are merely convenient labels applied to these quantities. Unless specifically stated otherwise as apparent from the context, descriptions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission, or display devices.

Certain aspects of the example embodiments include process steps and instructions described herein in the form of an algorithm. It should be noted that the process steps and instructions of the example embodiments could be embodied in software, firmware, or hardware, and when embodied in software, could be downloaded to reside on and be operated from different platforms used by a variety of operating systems. Some example embodiments also relate to an apparatus for performing the operations described in the disclosure. This apparatus might be specially constructed for the required purposes, or it may comprise a general-purpose computer selectively activated or reconfigured by a computer program stored in the computer. Such a computer program might be stored in a computer-readable storage medium, such as, but is not limited to, any type of disk including floppy disks, optical disks, CO-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions.

Furthermore, one or more of computers referred to in the disclosure might include a single processor or might be architectures employing multiple processor designs for increased computing capability. The algorithms and/or displays described in the disclosure are not inherently related to any particular computer or other apparatus. Various general-purpose systems may also be used with programs in accordance with the teachings described in the disclosure, or it might prove convenient to construct more specialized apparatuses to perform the described method steps.

In addition, the example embodiments in the disclosure are not described with reference to any particular programming language. It will be appreciated that a variety of programming languages might be used to implement the example embodiments.

Accordingly, the disclosure of the example embodiments is intended to be illustrative, but not limiting, of the scope of the inventions, which are set forth in the following claims and their equivalents. Although example embodiments of the inventions have been described in some detail for purposes of clarity of understanding, it will be apparent that certain changes and modifications can be practiced within the scope of the following claims. In the following claims, elements and/or steps do not imply any particular order of operation, unless explicitly stated in the claims or implicitly required by the disclosure.

What is claimed is:

1. A method for displaying an online game in a content stream, comprising:
   receiving a website logon from a user of a computing device and retrieving a profile associated with the logon;
   causing a content stream associated with the profile to be displayed in a graphical user interface presented by the computing device, wherein the content stream includes multiple content posts and a view associated with a multiplayer online game, the multiple content posts including content posts by the user and content posts by friends associated with the user through a social graph, and wherein relative locations in the content stream of the multiple content posts and the view associated with the game are ordered on the basis of recency;
   updating the view associated with the game in response to an event recognized by a game mechanics model of the game; and
   relocating the view associated with the game to a location of prominence in the content stream, if user data associated with the user who logged on to the website indicates that the user is a participant of the game, the relocating of the view associated with the game to the location of prominence causing the relative locations in the content stream of the multiple content posts and the view associated with the game to be different from the relative locations of the multiple content posts and the view associated with the game when ordered on the basis of recency.

2. The method of claim 1, wherein the method further comprises:
   maintaining the relative location of the view associated with the game within the content stream, if the user data associated with the user who logged on to the website indicates that the user is a spectator of the game.

3. The method of claim 1, wherein the graphical user interface is associated with a social networking website.

4. The method of claim 1, wherein the content stream is a content feed displayed by a social networking website.

5. The method of claim 1, wherein the computing device is a smartphone.

6. The method of claim 1, wherein the view associated with the game includes a current state of a game board, the players participating in the game, and an indication as to which player is to take a next turn or to make a next move.

7. The method of claim 6, wherein the view associated with the game further includes a current score of the game.

8. The method of claim 7, wherein the view associated with the game further includes comments provided by players participating in the game or by spectators of the game.

9. The method of claim 1, wherein the event recognized by the game mechanics model of the game is one of a game move, a change in a score of the game, and a comment regarding the game.

10. A computer program embedded in a non-transitory computer-readable storage medium, the computer program, when executed by one or more processors, causing an online game to be displayed in a content stream, the computer program comprising:

program instructions for receiving a website logon from a user of a computing device and for retrieving a profile associated with the logon;

program instructions for causing a content stream associated with the profile to be displayed in a graphical user interface presented by the computing device, wherein the content stream includes multiple content posts and a view associated with a multiplayer online game, the multiple content posts including contest posts by the user and content posts by friends associated with the user through a social graph, and wherein relative locations in the content stream of the multiple content posts and the view associated with the game are ordered on the basis of recency;

program instructions for updating the view associated with the game in response to an event recognized by a game mechanics model of the game; and program instructions for relocating the view associated with the game to a location of prominence in the content stream, if user data associated with the user who logged on to the website indicates that the user is a participant of the first game, the relocating of the view associated with the game to the location of prominence causing the relative locations in the content stream of the multiple content posts and the view associated with the game to be different from the relative locations of the multiple content posts and the view associated with the game when ordered on the basis of recency.

11. The computer program of claim 10, further comprising:
program instructions for maintaining the relative location of the view associated with the first game within the content stream, if the user data associated with the user who logged on to the website indicates that the user is a spectator of the game.

12. The computer program of claim 10, wherein the graphical user interface is associated with a social networking website.

13. The computer program of claim 10, wherein the content stream is a feed displayed by a social networking website.

14. The computer program of claim 10, wherein the computing device is a smartphone.

15. The computer program of claim 10, wherein the view associated with the game includes a current state of a game board, the players participating in the game, and an indication as to which player is to take a next turn or to make a next move.

16. The computer program of claim 15, wherein the view associated with the game further includes a current score of the game.

17. The computer program of claim 16, wherein the view associated with the game further includes comments provided by players participating in the game or by spectators of the game.

18. The computer program of claim 1, wherein the event recognized by the game mechanics model of the game is one of a game move, a change in a score of the game, and a comment regarding the game.

19. A method for displaying an online game in a content stream, comprising:

receiving a website logon from a user of a computing device and retrieving a profile associated with the logon;

causing a content stream associated with the profile to be displayed in a graphical user interface presented by the computing device, wherein the content stream includes multiple content posts and a view associated with a multiplayer online game, the multiple content posts including content posts by the user and content posts by friends associated with the user through a social graph, and wherein relative locations in the content stream of the multiple content posts and the view associated with the game are ordered on the basis of recency;

updating the view associated with the game in response to an event recognized by a game mechanics model of the game; and relocating the view associated with the game to a location of prominence in the content stream based on the event, the relocating of the view associated with the game to the location of prominence causing the relative locations in the content stream of the multiple content posts and the view associated with the game to be different from the relative locations of the multiple content posts and the view associated with the game when ordered on the basis of recency.

20. The method of claim 19, wherein the view associated with the game is relocated to the location of prominence in the content stream when the event recognized by the game mechanics model of the game is a game move.

21. The method of claim 6, wherein the view associated with the game includes the current state of the game board rendered in a spectator view.

22. The method of claim 6, wherein the view associated with the game includes the current state of the game board rendered in an expanded player view, the expanded player view including controls that enable a player to make a game move in the game.

23. The computer program of claim 15, wherein the view associated with the game includes the current state of the game board rendered in an expanded player view, the expanded player view including controls that enable a player to make a game move in the game.

24. The method of claim 19, wherein the view associated with the game includes a current state of a game board rendered in a spectator view.

25. The method of claim 19, wherein the view associated with the game includes a current state of a game board rendered in an expanded player view, the expanded player view including controls that enable a player to make a game move in the game.

* * * * *